United States Patent [19]
Arguimbau et al.

[11] 3,757,769
[45] Sept. 11, 1973

[54] ACOUSTIC ADMITTANCE TESTING APPARATUS

[75] Inventors: Lawrence B. Arguimbau, Lancaster; Rufus L. Grason, Lincoln, both of Mass.

[73] Assignee: Grason-Stadler Company, Inc., West Concord, Mass.

[22] Filed: Nov. 1, 1971

[21] Appl. No.: 194,268

[52] U.S. Cl.................. 128/2 Z, 73/67.1, 179/1 N
[51] Int. Cl............................................ A61b 10/00
[58] Field of Search................... 128/2 R, 2 Z, 2 S, 128/2 K, 2 V, 2.08; 73/67.1, 69; 179/1 N

[56] References Cited
UNITED STATES PATENTS

| | | | |
|---|---|---|---|
| 3,410,264 | 11/1968 | Frederik | 128/2.08 X |
| 3,295,513 | 1/1967 | Dippolito | 128/2 Z |
| 2,415,310 | 2/1947 | Summerville et al. | 128/2 Z |
| 3,598,111 | 8/1971 | Kahn et al. | 128/2.08 |
| 3,395,697 | 8/1968 | Mendelson | 179/1 N X |
| 3,440,867 | 4/1969 | Prall et al. | 73/67.1 |

*Primary Examiner*—Kyle L. Howell
*Attorney*—Herbert W. Kenway et al.

[57] ABSTRACT

Various characteristics of a patient's ear at the drum are tested by measuring, at the entrance of the ear canal, the complex acoustic admittance of the ear canal and the admittance at the eardrum together. An acoustic source including a first electro-acoustic transducer provides both an oscillatory air flow and a corresponding signal representing the flow. A second electro-acoustic transducer provides a pressure signal. The in-phase and quadrature components of the flow signal are then separately measured relative to the pressure signal while the static pressure in the ear canal is varied so as to controllably stiffen the eardrum, reducing its effect on the total complex admittance.

21 Claims, 3 Drawing Figures

ACOUSTIC ADMITTANCE TESTING APPARATUS

BACKGROUND OF THE INVENTION

This invention relates to apparatus for testing at a patient's eardrum and more particularly to such apparatus which functions by measuring the complex acoustic admittance at the entrance of the patient's ear canal under different static pressures.

For diagnostic purposes, it is useful for a physician or audiologist to be able to measure the various acoustic characteristics of a patient's eardrum in that various middle ear malfunctions produce recognizable changes in the acoustic behavior at the eardrum. For example, if the eardrum acts unusually stiffly, this may be an indication that the stapes, i.e. the bones transmitting sound from the drum to the fluid in the inner ear, is held rigid by a bony growth (an indication that the patient suffers from a condition known as otosclerosis). Similarly, if the eardrum shows abnormally high mobility, this is an indication that some element in the acoustic chain has become disconnected, i.e. an ossicular discontinuity.

Since the dimensions of the ear canal do not permit ready access to the eardrum itself for direct measurement, acoustic impedance or admittance measurements are usually conducted at the entrance to the ear canal and some compensation must be made for the properties of the canal itself. In the Zwislocki acoustic bridge apparatus, a compensating volume is placed in series with a comparison standard so that the effect of the canal is roughly balanced out and the comparison standard can be balanced against impedance at the patient's eardrum. The compensating volume to be used is determined in advance by measuring the volume of liquid required to fill the patient's ear canal.

The Terkildsen bridge measures the impedance of the ear canal and drum at normal pressure and then re-measures the impedance while the eardrum is stiffened by the application of a positive or negative static air pressure. However, only the absolute values of acoustic impedance are measured and no allowance is made for the actual complex nature of the eardrum's acoustic behavior.

As is recognized in the practice of the present invention, the behavior at the eardrum is, in fact, best represented by a complex quantity since the eardrum/middle ear combination is in fact neither massless nor lossless, but rather responds in a damped or lossy fashion. In other words, the present invention takes into account the fact that stiffening the eardrum by the application of a static pressure may introduce a substantial phase shift in the response of the total canal/drum/middle-ear complex. Accordingly, as measured by the apparatus of the present invention, the change in response due to the stiffening of the eardrum may be substantially different than that which would be represented by mere numerical measurement of the absolute values of impedances, stiffened and normal.

Among the several objects of the present invention may be noted the provision of apparatus for measuring the complex acoustic characteristics at a patient's eardrum; the provision of such apparatus in which both in-phase and quadrature components of eardrum behavior are accounted for; the provision of apparatus for measuring the complex acoustic admittance at the entrance of a patient's ear canal for normal and stiffened conditions of the patient's eardrum; the provision of such apparatus which is highly accurate, which is reliable and which is of relatively simple and inexpensive construction. Other objects and features will be in part apparent and in part pointed out hereinafter.

SUMMARY OF THE INVENTION

In the practice of the present invention, it is preferably the complex acoustic admittance of the canal/-drum/middle-ear complex which is measured, rather than the impedance. This choice facilitates the separation of the real and imaginary components of the acoustic response at the eardrum from the response of the ear canal.

Briefly, testing apparatus according to the present invention employs a first electro-acoustic transducer, coupled to the ear canal, which is energized to produce an oscillatory air flow in the ear canal, a signal being simultaneously provided which is correlated with the flow. A second electro-acoustic transducer, also coupled to the ear canal, provides a response signal which is correlated with the acoustic pressure in the canal. Means are provided for controllably varying the static air pressure in the canal for the purpose of selectively stiffening the eardrum. Further means are provided for measuring, with respect to one of the signals, the relative amplitude of the in-phase component of the other signal and the relative amplitude of the quadrature component, at different levels of static air pressure. Accordingly, changes in these components due to stiffening of the patient's eardrum by the varying static pressure can be perceived and distinguished from components of the response signal which are due to ear canal characteristics.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
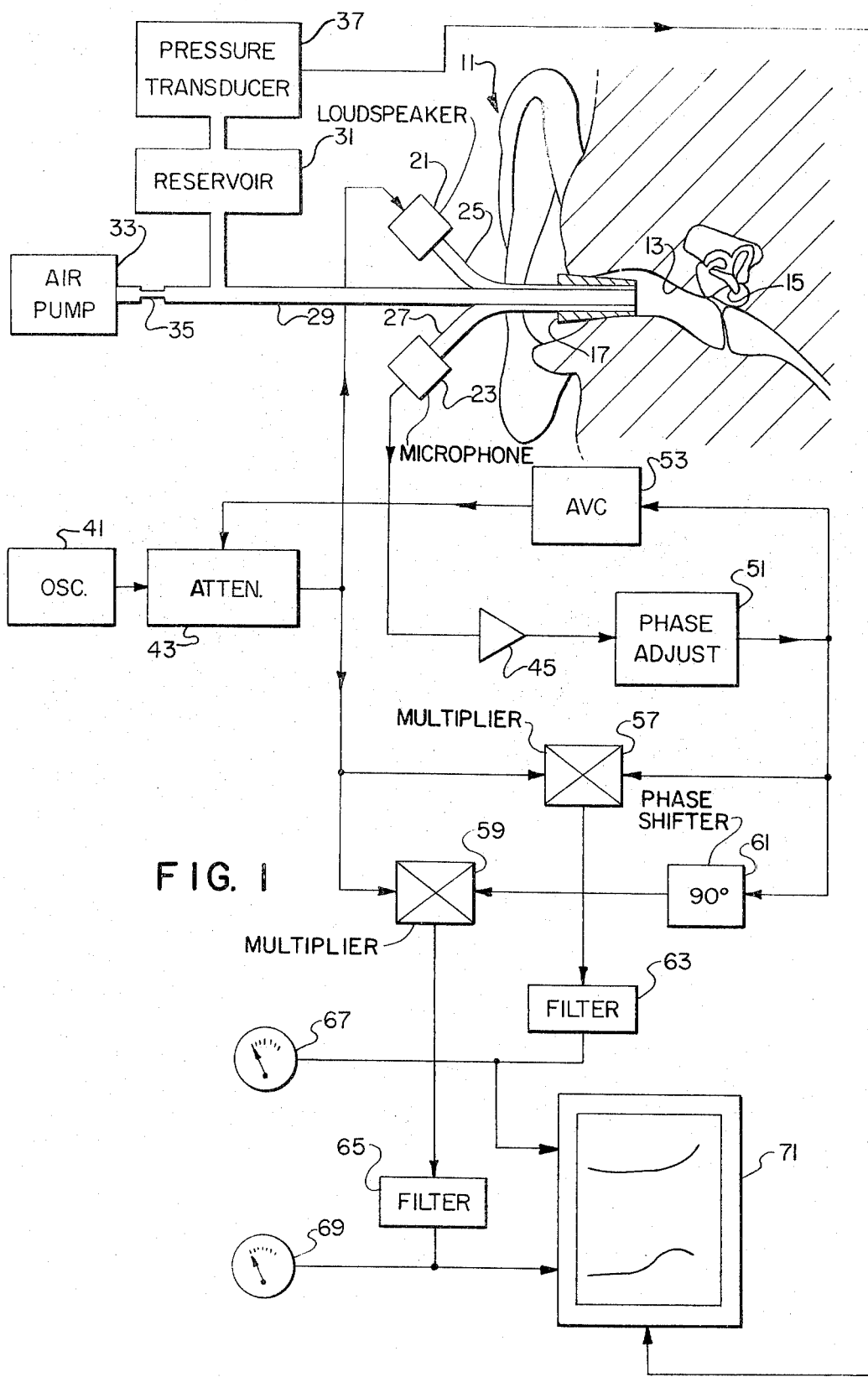
FIG. 1 is a schematic block diagram of a first embodiment of acoustic admittance testing apparatus of the present invention.

Referring now to FIG. 1, there is indicated very diagrammatically at 11 a patient's ear, having an ear canal 13 which communicates with the eardrum 15. An earplug 17 is provided which is preferably constructed of a relatively compliant material to facilitate sealing. A miniature loudspeaker 21 and a pressure microphone 23 are copuled to the ear canal 13 through respective tubes 25 and 27 which pass through the earplug 17 and are sealed therein. Both loudspeaker 21 and microphone 23 may be of the hearing aid transducer type.

Plug 17 also accommodates a capillary tube 29 which is connected to a plenum or reservoir 31 which acts as a static pressure source. Reservoir 31 is supplied with air at a predetermined rate from a pump 33 operating through a capillary tube 35 so as to generate within reservoir 31 a relatively steady air pressure which rises in controllable or predictable fashion. A pressure transducer 37 is connected to reservoir 31 to provide an electrical signal representing the pressure existing at any given moment.

Loudspeaker 21 is energized from an audio oscillator 41 through a controllable attenuator 43 so as to provide an adjustable acoustic or oscillatory air flow at the entrance to the patient's ear canal. The electrical signal provided by oscillator 41 is employed, in the apparatus described hereinafter, as representing the oscillatory air flow in the patient's ear canal. As will be understood by those skilled in the art, this signal will be in phase correlation with the air flow in the ear canal, though perhaps not in perfect phase synchronization therewith, due to phase shifts and reactive effects in the transducer 21 and the tube 25.

A signal representing the pressure present at the entrance of the patient's ear canal is provided by means of the microphone 23, suitable preamplification being provided by an amplifier 45. As with the flow signal, the response signal obtained by means of the microphone 23 is proportional to and in phase correlation with the instantaneous pressure present at the entrance to the ear canal 13, though perhaps not in perfect phase synchronization therewith due to reactive effects in the transducer 23 and the tube 27. However, since the determination of acoustic admittance by the apparatus described herein requires only the determination of the complex ratio of the air flow to pressure, a single phase adjustment in either signal channel can compensate for both sets of phase shifts. An adjustable phase adjuster for this purpose is indicated at 51 in the pressure signal channel.

In the preferred embodiment of FIG. 1, the amplitude of the pressure signal is maintained substantially constant by means of an AVC circuit 53. AVC circuit 53 responds to the average amplitude or envelope of the pressure signal and adjusts the attenuator 45 correspondingly so as to maintain the pressure signal at a substantially predetermined level. In other words, a servo-loop is established.

A pair of analog multipliers 57 and 59 is provided for separating, with respect to the pressure signal, the in-phase and quadrature components of the flow signal. For this purpose, the constant amplitude pressure signal is applied directly to one of the inputs of multiplier 57 and to one of the inputs of the other multiplier 59 through a 90-degree phase shifter 61. The flow signal is applied directly to the other input terminal of both multipliers. The output signals from the multipliers 57 and 59 are time-averaged by means of suitable low-pass or d.c. filters, 63 and 65 respectively, to provide a pair of signals which are proportional to the amplitudes of the in-phase and quadrature components of the flow signal, respectively. Since the amplitude of the pressure signal is held essentially constant by means of the operation of the AVC circuit 53, it can be seen that these d.c. signals properly represent susceptance and conductance directly. These signals may be applied directly to suitable meters as indicated at 67 and 69 but, preferably, these signals are also recorded for subsequent study and analysis by means of a dual input XY recorder 71, the X axis of the recorder being controlled by the signal obtained from pressure transducer 37 so that both the susceptance and conductance signals are separately recorded as functions of the static air pressure in the ear canal.

As will be understood by those skilled in the electroacoustic arts, a lossless cavity will represent pure susceptance while factors producing loss or energy absorption will introduce a conductance component. Accordingly, initial adjustment of the compensating phase shifter 51 may be accomplished by coupling the plug 17 to an essentially loss-free cavity, approximating an ear canal, and adjusting the compensation until no component of conductance is registered.

As indicated previously, the application of a static air pressure inside the ear canal can effectively stiffen the eardrum so that its compliance does not as significantly contribute to the overall admittance of the patient's ear. Accordingly, the contribution to admittance provided by the eardrum can be recognized through the variations in the complex admittance produced by static pressure change. However, since both susceptance and conductance are measured, it can be seen that the diagnostician has available information which will allow him to separate components of admittance due to compliance (producing susceptance) and viscous loss (producing conductance). Likewise, since the admittance is measured as a complex quantity, it can be seen that the full amplitude of a change in admittance can be recognized whereas the significance of such a change could at least partially be concealed if only absolute or numerical quantities were measured rather than vector quantities.

Figure 2:
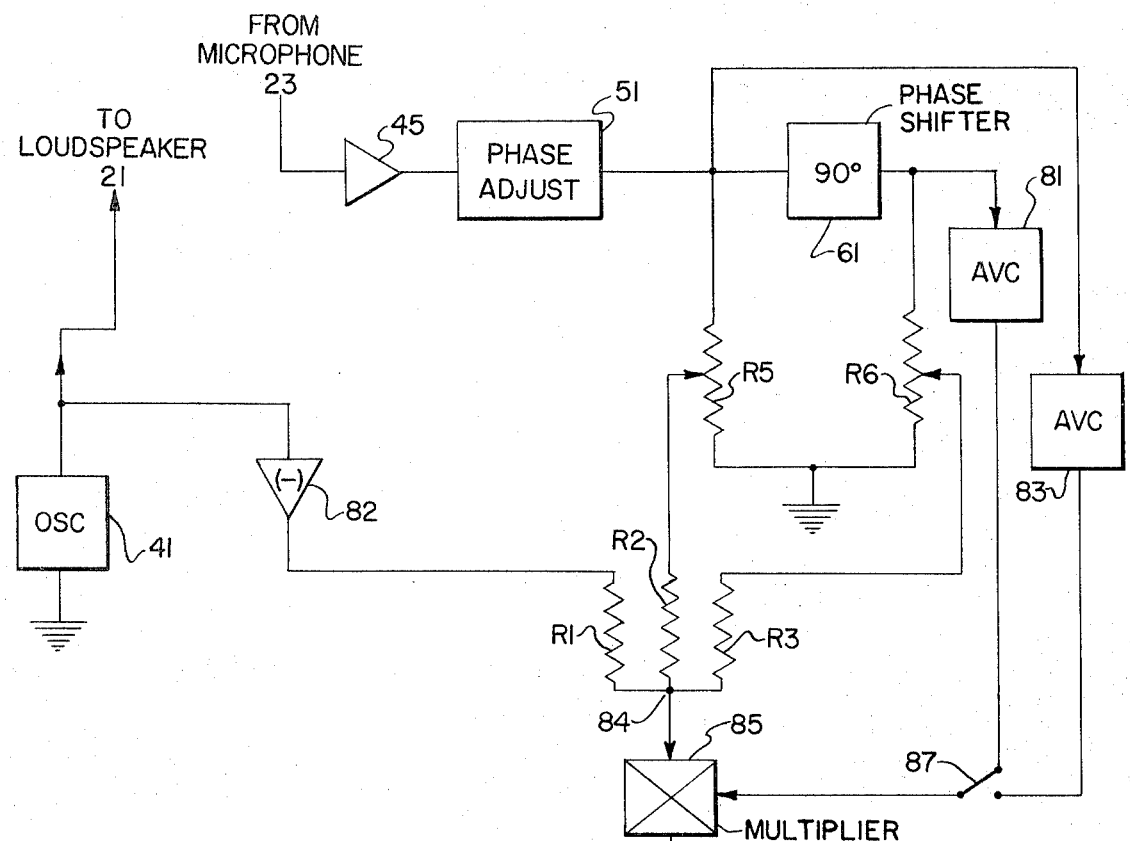
FIG. 2 is a schematic block diagram of a second embodiment.

In the embodiment of FIG. 2, the in-phase and quadrature components of the flow signal are measured by means of a nulling procedure, the static pressure level being manually adjusted to suitable discrete levels by appropriate means (not shown). In this system, the loudspeaker 21 is driven at constant amplitude and the pressure or response signal is allowed to vary. The phase shifter 51 which provides for an initial phase adjustment is again employed as is the 90-degree phase shifter 61. Respective preselectably proportions of both the shifted and unshifted pressure signal are obtained by means of a pair of potentiometers R5 and R6. These components, of adjustable amplitude, are then bucked against an inverted or negative version of the flow signal in a mixing network comprising resistors R1, R2 and R3 which are commonly connected to a mixing junction 84. The inverted flow signal is indicated as being obtained from oscillator 41 through an inverting amplifier 82 but, as understood by those in the art, a mere reversal of connections may suffice.

In order to allow the in-phase and quadrature components to be independently recognized and nulled, the junction 84 is connected to one input terminal of an analog multiplier 85 which, as in the previous embodiment, is employed to effect a phase correlation. The shifted and unshifted versions of the pressure signal are applied to respective AVC amplifiers 81 and 83 so as to obtain corresponding phase reference signals of substantially constant amplitude. One or the other of these constant amplitude signals is applied as the other input signal to multiplier 85, through a selector switch 87. Since the signals obtained from the amplifiers 81 and 83 are of essentially constant amplitude, the output signal from the multiplier 85 is thus essentially synchronously responsive to either the in-phase or the quadrature component of the other input signal applied thereto, i.e. the unbalance signal present at the mixing junction 84. The output signal from the multiplier 85 is time-averaged by means of a low-pass or d.c. filter 89 and the resultant d.c. component is displayed on a zero center or null meter 91.

When the switch 87 is in its lower position, the output signal from the multiplier 85 is responsive essentially only to the in-phase component of the unbalance signal applied to its other input and, thus, potentiometer R5 can be adjusted until a null is obtained. Similarly, when the switch 87 is in its upper position, the output signal from multiplier 85 is responsive essentially only to the quadrature component of the unbalance signal and the potentiometer R6 may be adjusted to obtain a null. Since the settings of the potentiometers R5 and R6 represent the proportions of the response signal required to balance a preset level of reference signal, it can be seen that these settings likewise represent the susceptance and conductance components respectively of the acoustic admittance of the patient's ear. In other words, means have again been provided for measuring the complex acoustic admittance of the ear channel plus eardrum, each of the complex components being measured separately. Further, this measurement has been obtained by means of a multiplier which, through cross-correlation of a pair of signals, is made responsive essentially only to either the in-phase or quadrature component at any given moment.

If desired, the acoustic flow rather than the pressure could be held constant. The pressure developed by the flow would then be proportional to impedance rather than admittance. Minor shifts in the interconnections of microphone preamplifier, drive current, the multipliers and the 90° phase shifter would make is possible to make two meters read directly in total resistance and total reactance. However, for the particular application in hand, the admittance connection makes possible an easier correction for the canal.

Figure 3:
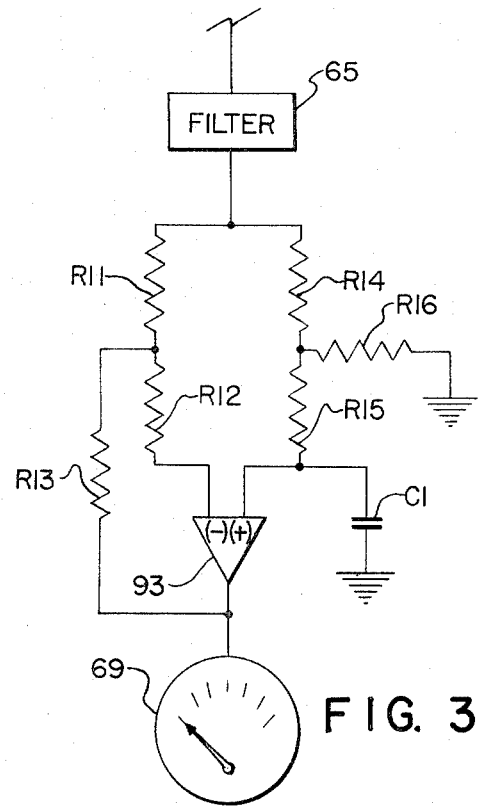
FIG. 3 is a schematic circuit diagram of a modification for the embodiment of FIG. 1 providing increased sensitivity to abrupt changes in signal level.

Apparatus of the present invention is also useful in determining so-called acoustic reflex. If a differential amplifier 93 having delayed and non-delayed input circuits as illustrated in FIG. 3 is interposed between each meter (67 and 69) of FIG. 1 and its respective input lead it can be seen that the meter reading will be rendered responsive to rate-of-change of amplitude as well as to the absolute value of amplitude. Thus abrupt changes in the signal amplitude, i.e. changes occurring in a time which is short as compared with the time constant of resistor R15 and capacitor C1, will be disproportionately amplified. A scale expansion of 20:1 is appropriate. For relatively slow changes in the amplitude of the input signal, the output signal from amplifier 93 closely follows its input signal due to the effect of the feedback resistor R13.

As is understood, the acoustic reflex causes the eardrum to be stiffened by involuntary muscular reflex. Thus if an acoustic reflex is produced, e.g. by means of a stimulus applied to the patient's other ear, the effect can be readily perceived in the output signal registered on the appropriate meter. The rate-of-change expansion can also be applied to the recorded signal as well.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for testing a patient's ear, said apparatus comprising:
   a first electro-acoustic transducer adapted to be acoustically coupled to the patient's ear canal;
   means for energizing said first transducer to produce an oscillatory air flow in an ear canal to which said transducer is coupled and for providing a signal which is correlated with said flow;
   means, including a second electro-acoustic transducer adapted to be coupled to the ear canal, for generating a response signal which is correlated with the acoustic pressure in the ear canal;
   means for controllably varying the static air pressure in the canal; and
   means interconnected with both transducers for measuring, with respect to one of said signals, both the relative amplitude of the in-phase component of the other signal and the relative amplitude of the phase quadrature component of said other signal at different levels of static air pressure in the ear canal, whereby changes in said relative amplitudes caused by stiffening of a patient's eardrum by the varying static pressure are indicative of characteristics of the unstiffened eardrum.

2. Apparatus as set forth in claim 1 wherein said measuring means comprises at least one analog signal multiplier.

3. Apparatus as set forth in claim 2 wherein said means for varying static pressure comprises a plenum chamber and means for providing a flow of air relative to said chamber thereby to generate therein a pressure which varies as a function of time.

4. Apparatus as set forth in claim 1 including means for phase shifting said pressure signal 90° and performing a cross-correlation and time averaging of said flow signal with both said shifted and unshifted pressure signals.

5. Apparatus as set forth in claim 4 wherein said means for performing a cross-correlation and time averaging comprises an analog signal multiplier and a low pass filter.

6. Apparatus as set forth in claim 1 including AVC means controlled by said pressure signal for varying the energization of said first transducer to maintain the amplitude of said pressure signal substantially at a preselected level.

7. Apparatus as set forth in claim 1 including an adjustable phase shifter in the path of one of said signals to compensate for phase shifts which are not a function of the acoustic admittance of the patient's ear.

8. Apparatus as set forth in claim 1 wherein said measuring means includes means for differentially amplifying relatively rapid changes in at least one of said components.

9. Apparatus for testing a patient's eardrum, said apparatus comprising:
   a first electro-acoustic transducer adapted to be acoustically coupled to the patient's ear canal;
   means for energizing said first transducer to produce an oscillatory air flow of adjustable amplitude in an ear canal to which said transducer is coupled and for providing a signal which is correlated with said flow;
   means, including a second electro-acoustic transducer adapted to be coupled to the ear canal, for generating a signal which is correlated with the acoustic pressure in the ear canal;

means operating in response to the amplitude of said pressure signal for adjusting the amplitude of said oscillatory air flow to maintain said pressure signal at a substantially constant level;

means for controllably varying the static air pressure in the canal;

means for phase shifting said pressure signal by substantially 90°; and means for cross-correlating said flow signal with both the phase shifted and unshifted pressure signals thereby to generate respective admittance component signals, whereby stiffening of the patient's eardrum by varying static pressure permits the measurement of the characteristics of the ear canal alone and the determination of the effect of the unstiffened eardrum.

10. Apparatus as set forth in claim 9 wherein said cross-correlating means comprises a respective analog signal multiplier and low pass filter for each said shifted and unshifted pressure signals whereby the respective admittance component signals are available simultaneously.

11. Apparatus as set forth in claim 9 including means for indicating the values of said admittance component signals.

12. Apparatus as set forth in claim 9 including means for recording the values of said admittance component signals.

13. Apparatus for testing admittance at the plane of a patient's eardrum, said apparatus comprising:
   a first electro-acoustic transducer adapted to be acoustically coupled to the patient's ear canal;
   means for energizing said first transducer to produce an oscillatory air flow of adjustable amplitude in an ear canal to which said transducer is coupled and for providing a signal which is correlated with said flow;
   means, including a second electro-acoustic transducer adapted to be acoustically coupled to the ear canal, for generating a signal which is correlated with the acoustic pressure in said ear canal;
   amplitude control means operating in response to the amplitude of said pressure signal for adjusting the amplitude of said oscillatory air flow to maintain said pressure signal at a substantially constant level;
   means for varying the static air pressure in said canal as a function of time;
   means, including an analog signal multiplier and a low pass filter for cross-correlating said flow signal with said pressure signal thereby to generate a conductance signal;
   means for phase shifting said pressure signal by substantially 90°;
   means, including an analog signal multiplier and a low pass filter for cross-correlating said flow signal with the phase shifted pressure signal thereby to generate a susceptance signal; and
   means for recording said susceptance and conductance signals as a function of static pressure.

14. Apparatus as set forth in claim 13 including means for differentially amplifying relatively rapid changes in said susceptance signal and said conductance signal.

15. Apparatus for testing admittance of a patient's eardrum, said apparatus comprising:
   a first electro-acoustic transducer adapted to be acoustically coupled to the patient's ear canal;
   means for energizing said first transducer to produce an osciallatory air flow in an ear canal to which said transducer is coupled and for providing a signal which is correlated with said flow;
   means, including a second electro-acoustic transducer adapted to be acoustically coupled to the ear canal, for generating a signal which is correlated with the acoustic pressure in the ear canal;
   means for phase shifting said pressure signal by substantially 90°;
   means for mixing a first signal which is a preselectable proportion of the amplitude of said pressure signal, a second signal which is a preselectable proportion of said shifted pressure signal, and said flow signal thereby to obtain a sum signal;
   means for controllably varying the static air pressure in said canal; and
   means for separately indicating the amplitude of the in-phase and quadrature components of said sum signal with respect to said pressure thereby to permit said components to be nulled whereby the proportions of said pressure signal and phase shifted pressure signal required to be mixed to obtain a null are representative of the conductance and susceptance respectively of the patient's eardrum and canal and whereby stiffening of the patient's eardrum by varying static pressure permits the measurement of the characteristics of the ear canal alone and the determination of the admittance at the plane of the unstiffened eardrum.

16. Apparatus as set forth in claim 15 including respective adjustable potentiometers for preselecting the proportions of said shifted and unshifted pressure signals.

17. Apparatus as set forth in claim 15 wherein said mixing means includes a resistive mixing network having a series resistance coupling each of the mixed signals to a summing junction.

18. Apparatus as set forth in claim 15 wherein said means for separately indicating includes means for cross-correlating said sum signal with either the phase shifted or unshifted pressure signal.

19. Apparatus as set forth in claim 18 including AVC means for bringing either the phase shifted or unshifted pressure signal to a substantial predetermined amplitude prior to cross-correlation.

20. Apparatus as set forth in claim 18 wherein said cross-correlating means incldes an analog signal multiplier and a low pass filter.

21. Apparatus as set forth in claim 20 including a null meter for indicating the value of the cross-correlation product signal.

* * * * *